United States Patent [19]

Ruta

[11] Patent Number: 4,642,724
[45] Date of Patent: Feb. 10, 1987

[54] TRIP SIGNAL GENERATOR FOR A CIRCUIT INTERRUPTER

[75] Inventor: Joseph W. Ruta, Elmhurst, Ill.

[73] Assignee: S&C Electric Company, Chicago, Ill.

[21] Appl. No.: 658,239

[22] Filed: Oct. 3, 1984

Related U.S. Application Data

[63] Continuation-in-part of Ser. No. 506,943, Jun. 22, 1982.

[51] Int. Cl.$^4$ .......................................... H02H 3/093
[52] U.S. Cl. ..................................... 361/96; 361/93; 361/97
[58] Field of Search .................... 361/87, 93, 94, 95, 361/96, 97

[56] References Cited

U.S. PATENT DOCUMENTS

| | | | |
|---|---|---|---|
| 3,290,556 | 12/1966 | Gram | 361/98 |
| 3,317,791 | 5/1967 | Price | 361/73 |
| 3,633,073 | 1/1972 | Day | 361/22 |
| 3,713,004 | 1/1973 | Skeehan | 361/96 |
| 3,831,061 | 8/1974 | Boyd | 361/94 |
| 3,968,410 | 7/1976 | Graham | 361/96 |
| 4,000,446 | 12/1976 | Vandevier | 361/31 |
| 4,012,669 | 3/1977 | Gelfand et al. | 361/87 X |
| 4,017,766 | 4/1977 | Vercellotti et al. | 361/83 |
| 4,149,210 | 4/1979 | Wilson | 361/95 |
| 4,219,860 | 8/1980 | Depay | 361/96 X |
| 4,246,623 | 1/1981 | Sun | 361/97 |
| 4,259,706 | 3/1981 | Zocholl | 361/96 |
| 4,322,766 | 3/1982 | Becker et al. | 361/87 X |
| 4,327,391 | 4/1982 | Grebielski | 361/87 X |
| 4,347,541 | 8/1982 | Chen et al. | 361/50 |
| 4,380,785 | 4/1983 | Demeyer et al. | 361/96 |
| 4,393,431 | 7/1983 | Gilker | 361/97 |
| 4,442,472 | 4/1984 | Pang | 361/96 |

FOREIGN PATENT DOCUMENTS 2614344 10/1977 Fed. Rep. of Germany .
1436831 5/1976 United Kingdom .

Primary Examiner—A. D. Pellinen
Assistant Examiner—Derek S. Jennings
Attorney, Agent, or Firm—James V. Lapacek

[57] ABSTRACT

A trip signal generator comprises a circuit possessing an inverse time-current characteristics for producing a trip signal in response to the occurrence of overcurrent in an alternating current line. The trip signal is produced after the passage of some time period, which varies inversely with the difference between the absolute magnitude of the overcurrent and a threshold current. The circuit includes a portion which produces pulses at a rate proportional to the difference between the absolute magnitude of the overcurrent in the line and the threshold current. The circuit produces no pulses when the line current is less than or equal to the threshold current. The circuit includes a counter for counting the pulses and for producing the trip signal after the counting of a selected number of pulses. Another portion of the circuit enables the counter when overcurrent is in the line, but resets the counter and prevents its operation when the line current is less than or equal to the threshold current. The counter may include a plurality of selectable outputs, each corresponding to a different count, thereby permitting the length of the delay before the trip signal is generated to be varied by selecting a different one of the outputs. The circuit also may include one or more range selectors for automatically selecting among two or more counter outputs so as to produce the trip signal after the passage of different ranges of time period corresponding to different ranges of overcurrent.

16 Claims, 7 Drawing Figures

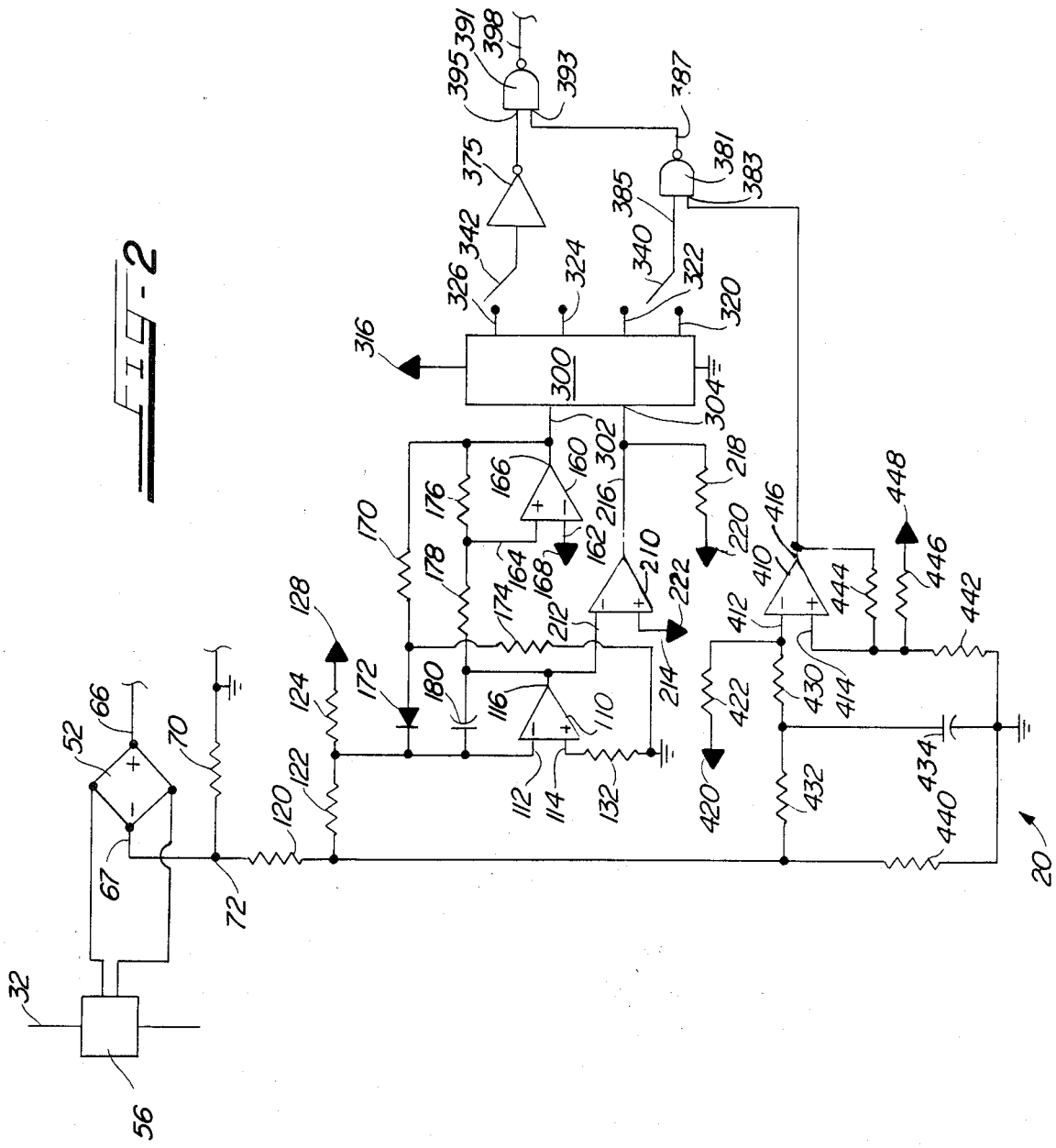

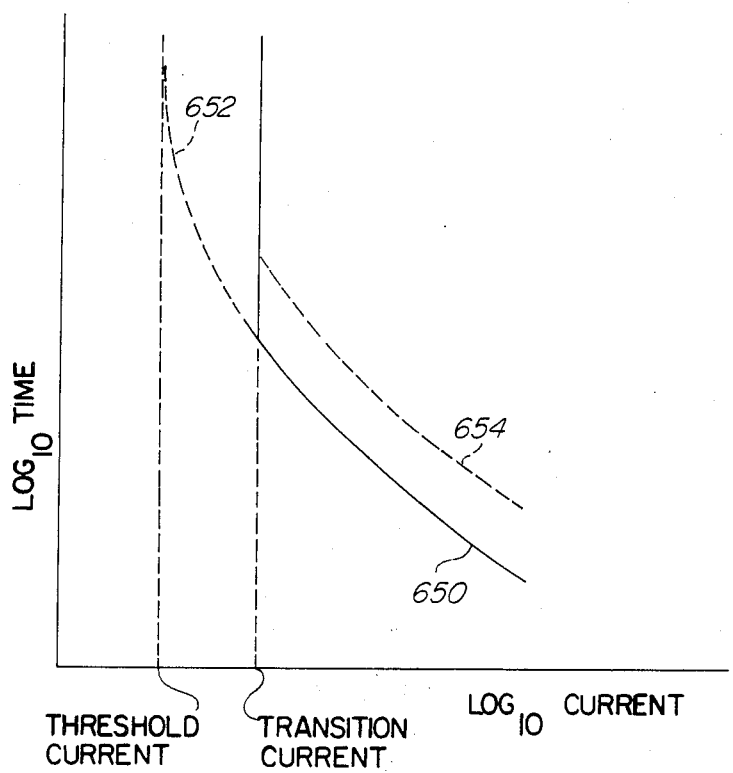

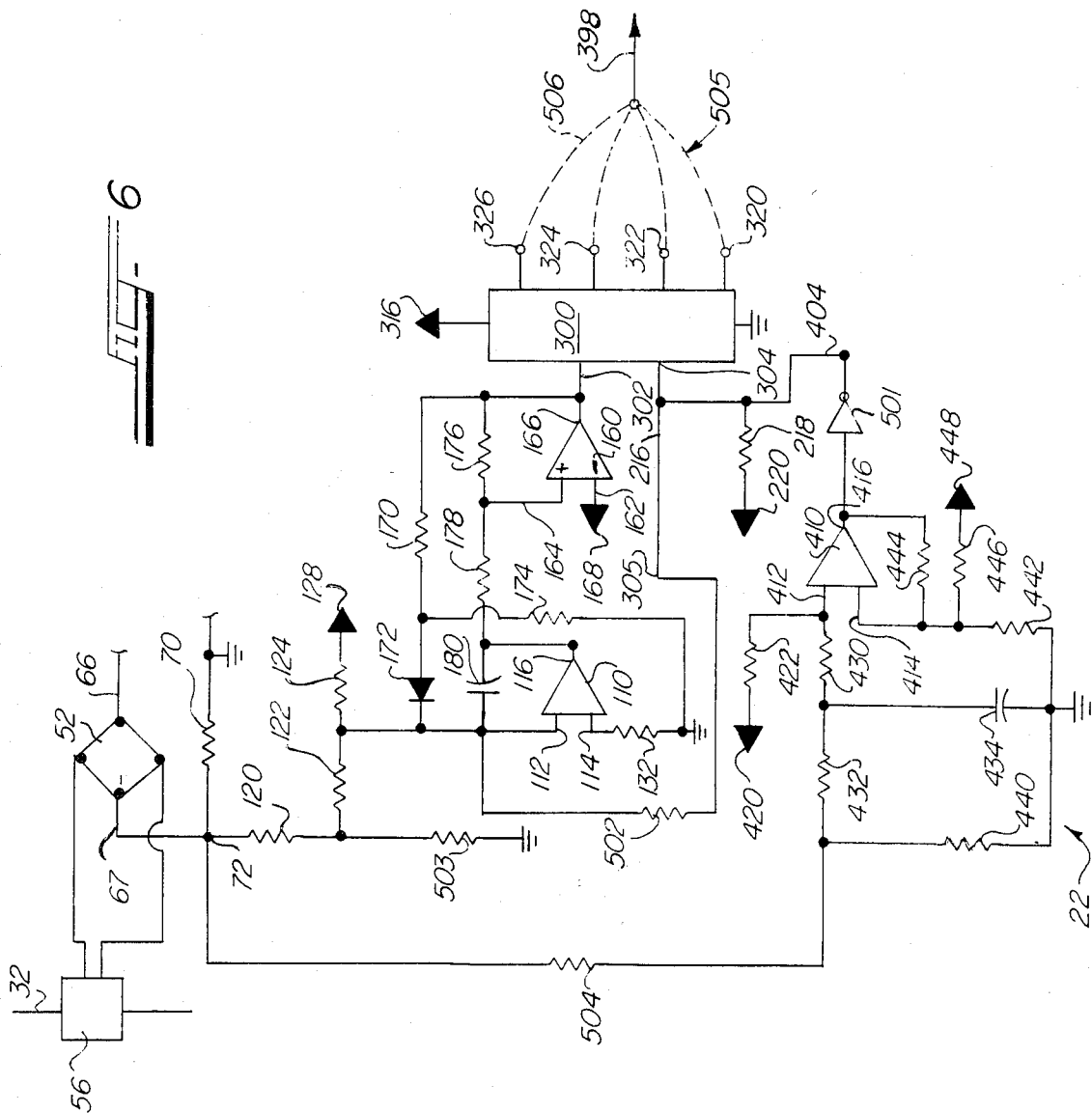

TRIP SIGNAL GENERATOR FOR A CIRCUIT INTERRUPTER

CROSS REFERENCE TO RELATED APPLICATIONS

This application is a continuation-in-part application of U.S. application Ser. No. 506,943 filed on June 22, 1983 in the name of Joseph W. Ruta.

BACKGROUND OF THE INVENTION

1. Field of the Invention

The present invention relates to an electronic circuit for generating a trip signal to operate a circuit interrupter in a line carrying alternating current and, more specifically, to a circuit for generating a trip signal to initiate the interruption of overcurrent in a line in response to, and a predetermined time after, the inception of overcurrent in the line. The predetermined time is inversely related to the magnitude of the overcurrent.

2. Description of the Prior Art

It is well known that typical prior art circuit interrupters such as fuses, circuit switchers, circuit breakers, and reclosers may respond to certain overcurrents according to various time-current characteristics. Some interrupters rely upon the effect of the overcurrent on the interrupter to open the circuit. For example in a fuse, overcurrent melts a fusible element to open the circuit, with the magnitude of the overcurrent determining how quickly the fusible element melts, thereby providing an inverse time-current characteristic. Other devices have used various types of sensors to detect current in a line and to operate circuit interrupters in response to overcurrent.

Prior art circuit interrupters operate according to time-current relationships which are characteristic of each particular type of interrupter. The time-current characteristic of many prior art circuit have provided limited flexibility in constructing a circuit interrupter having a particular overall time-current characteristic. For example, it would be desirable to match the time-current characteristic of an interrupter as precisely as possible to the damage curve of a transformer or other piece of equipment to be protected by the interrupter. Thus, it would be desirable in a circuit interrupter to be able to select a time-current characteristic with both straight and arcuate portions.

It is desirable that the higher the level of overcurrent in a protected line, the more quickly a circuit interrupter operates. Further, it is desirable that such circuit interrupters not respond to current in the line that is not overcurrent, regardless of the length of time such lower magnitude current flows.

It is desirable that circuit interrupters be operated reliably whenever overcurrent exists. It is also desirable that the level of current to which, and the delay before, the circuit interrupters responds be appropriate in light of the physical characterstics of the circuit interrupter and of the equipment in the line being protected.

Accordingly, one object of the present invention is to provide a trip signal generator for generating a trip signal to reliably operate an associated circuit interrupter.

It is a further object of the present invention to provide a trip signal generator for producing a trip signal after a time delay has elapsed following the onset of an overcurrent, the length of such time delay being inversely related to the magnitude of the overcurrent.

It is also an object of the present invention to provide a trip signal generator that can be readily adapted to respond to various levels of overcurrent, after various time delays, thereby permitting the trip signal generator to be matched with the design limitations of the associated circuit interrupter and of the equipment in the line being protected.

It is another object of the present invention to provide a trip signal generator in which the period of delay before a trip signal is generated in response to a given level of overcurrent is readily selectable, thereby permitting further adjustment of the trip signal generator to suit the design limitations of the associated circuit interrupter and of the equipment in the line.

Yet another object of the present invention is to provide a versatile trip signal generator that can be used to control the operation of various types of circuit interrupters and other devices, including, for example, circuit breakers, reclosers, circuit switchers, alarms, and the like.

SUMMARY OF THE INVENTION

With the above and other objects in view, the present invention comprises a trip generator for producing a trip signal in response to the occurrence of overcurrent in an associated line that normally carries an alternating current. As used herein, "overcurrent" means current exceeding a threshold current, which may be determined, for example, by the maximum current deemed acceptable in view of the characteristics of the line being protected and the equipment associated therewith. When an overcurrent occurs in the line, the trip signal generator produces a trip signal after a time delay, the length of which varies inversely with the difference between the overcurrent and the threshold current.

The trip signal generated by the present invention may be used to effect the operation of various devices, such as a circuit breaker, circuit switcher, recloser, or other type of circuit interrupter, or an alarm or similar device. For example, the present invention can be used to initiate operation of the circuit interrupters described in U.S. Pat. No. 4,359,708—Jarosz and Panas and U.S. Pat. No. 4,370,531—Tobin, both of which are commonly assigned to S&C Electric Company. The present invention may be used with the invention described in the co-pending U.S. patent application Ser. No. 506,944, entitled "Power Supply for a Circuit Interrupter," and may be a portion of the invention described in co-pending U.S. patent application Ser. No. 506,942, entitled "Control Circuit for a Circuit Interrupter," both of which are commonly assigned to S&C Electric Company.

The present invention includes a pulse generator that operates as a voltage-to-frequency converter, which produces pulses at a rate related to the value of input signals to the circuit when such input signals represent current in the line in excess of the selected threshold current (i.e., an overcurrent). The voltage-to-frequency converter may include an integrator and a Schmitt trigger, which receives as an input the output of the integrator.

A counter is provided for counting the output pulses from the Schmitt trigger of the voltage-to-frequency converter. A counter produces the trip signal after the counter has counted a selected number of pulses applied to the input of the counter.

A level detector may be included to enable the counter only when the input signal to the trip signal generator represents line current in excess of the threshold current. The level detector causes the counter to be reset to zero and prevents counting when the current in the line is below the threshold current.

The trip signal generator of the present invention may also include a range selector to select the count on which the counter will produce a trip signal. Thus, the range selector has the effect of increasing or decreasing the delay before a trip signal is produced in response to a given level of overcurrent. The range selector increases the time delay for lower overcurrents and decreases the time delay for higher overcurrents. The range selector may include a Schmitt trigger, the output of which carries an inhibit signal when the signals applied to an input thereof represents line current below a selected transition magnitude.

BRIEF DESCRIPTION OF THE DRAWINGS

FIG. 2 is a schematic diagram of one embodiment of the trip signal generator of the present invention;

FIGS. 3, 4, and 5 are generalized curves representing the relationship between time and current that will cause a trip signal to be generated by the present invention; and FIG. 6 is a schematic diagram of another embodiment of the trip signal general of the present invention.

DETAILED DESCRIPTION OF THE INVENTION

Figure 1A:
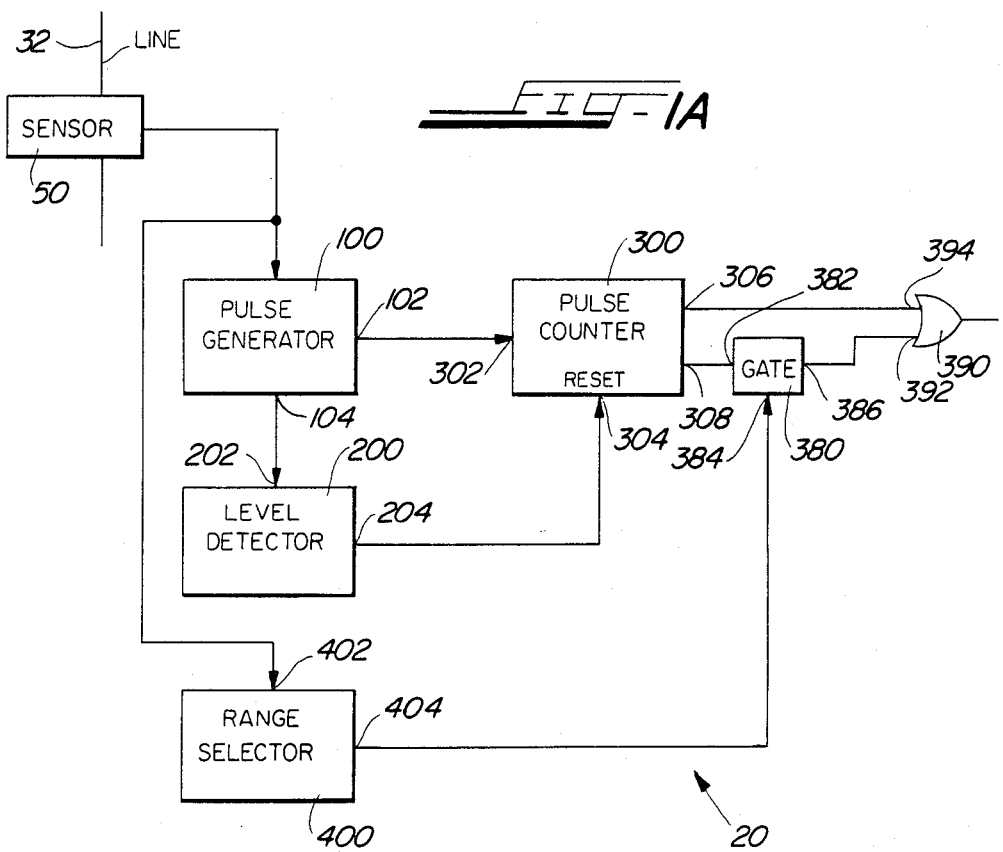
FIG. 1A is a block diagram of the trip signal generator of the present invention.

FIG. 1A is a block diagram of a trip signal generator 20 of the present invention, which produces a trip signal at the output of OR gate 390 in response to an overcurrent in a line 32, which may be one phase or conductor of a multi-phase, alternating-current circuit. The trip signal generator 20 includes a sensor or transducer 50, a pulse generator 100, a level detector 200 and a pulse counter 300. A range selector 400 may also be included.

The sensor 50 produces output signals which are proportional to the current in line 32. The signals form the sensor 50 are applied to the pulse generator 100. When the output signals from the sensor 50 represent current in the line 32 in excess of a threshold current magnitude, the pulse generator 100 produces pulses at a rate proportional to the difference between the overcurrent and the threshold current. As overcurrent in the line 32 increases or decreases with time, the rate at which pulses are generated by the pulse generator 100 increases or decreases correspondingly. The pulses produced at a first ouput 102 by the pulse generator 100 are applied to an input 302 of the pulse counter 300.

The pulse generator 100 also produces, at an output 104, a second output signal that is related to the output signals produced by the sensor 50, and hence to the current in the line 32. This second output signal at 104 from the pulse generator 100 is applied to the input 202 of the level detector 200. The level detector 200 produces a reset/inhibit signal on an output 204. The reset/inhibit signal is in a first state when the current in the line 32 is at or below the threshold current, and is in a second state when the current exceeds the threshold current (i.e., when an overcurrent exists). The reset/inhibit signal produced by the level detector 200 is applied to a reset input 304 of the pulse counter 300. when the reset/inhibit signal is in the first state, its application to the reset input 304 causes the pulse counter 300 to reset its count to zero and to cease counting any input pulses that may be applied to the input 302.

When the reset/inhibit signal is in the second state, its application to the reset input 304 permits the pulse counter 300 to count the pulses applied to its input 302.

When the pulse counter 300 has counted a selected first number of pulses applied to its input 302, it produces a trip signal at it first output 306. The pulse counter 300 does not produce the trip signal on the first output 306 until the selected first number of pulses has been counted, and, therefore, the trip signal is produced after a period of time (i.e., a time delay).

Figure 3:
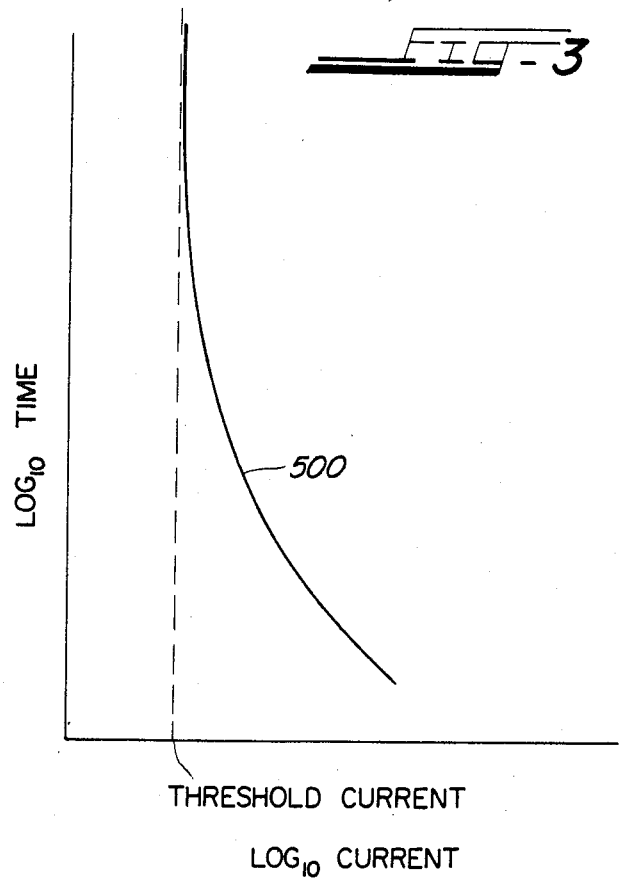

FIG. 3 illustrates the time-current characteristic ("TCC") of the trip signal generator 20 as so far described. As is well known, a TCC curve is a log-log plot of current versus time used to represent the response or operation of an electrical circuit interrupter. The dashed, vertical line labeled "threshold current" represents the current level below which no trip signal is produced on the first output 306 of the pulse counter 300, regardless of the length of time such current may exist. Current in the line 32 in excess of the threshold current is overcurrent, in response to which a trip signal is produced on the first output 306 according to the relationship illustrated by the TCC curve 500 in FIG. 3. For low levels of overcurrent in the line 32, a longer time delay passes before a trip signal is generated on the first output 306 (as shown by the upper portion of the TCC curve 500, which asymptotically approaches the vertical line labeled threshold current) than for high levels of overcurrent (as shown by the power portion of the TCC curve).

The pulse counter 300 also may have a second output 308 of which a trip signal is produced after a selected second number of pulses is counted. The selected second number of pulses is less than the selected first number. Accordingly, if pulses are applied to the pulse input 302, a trip signal is generated at the second output 308 before a trip signal is generated at the first output 306.

A trip signal generated at output 308 is applied to an input 382 of a gate 380, which is controlled by a blocking signal applied to input 384. When no blocking signal is present at the gate 380, a trip signal applied to input 382 is passed via output 386 to an input 392 of an OR gate 390. Application of a blocking signal to input 384 prevents any trip signal generated at the output 308 of the pulse counter from being applied to the OR gate 390. Therefore, if pulses are applied to the pulse input 302 (while the reset/inhibit signal is in the second state) and the blocking signal is applied to the input 384 of the gate 380, only a trip signal generated at the first output 306 after a time delay within a first range of time delays, as described above, will reach the output of the OR gate 390 via an input 394. However, if no blocking signal is applied to the input 384 of the gate 380, a trip signal generated at the second output 306 after a shorter time delay within a second range of time delays will reach the output of the OR gate 390 via the input 392. The first and second ranges of time delays are illustrated on the TCC curve 600 in FIG. 4.

The range selector 400 also receives, on its input 402, the output signals produced by the sensor 50. When the output signals represent overcurrent in the line 32 less than a predetermined level (hereinafter referred to as the "transition current"), the range selector 400 generates a blocking signal on its output 404, which is applied to the input 384 of the gate 380. The transition current is illustrated by the dashed vertical line labeled "Transition Current" in FIG. 4. Thus, for overcurrent between the threshold current and the transition current (hereinafter referred to a "low-moderate overcurrent") a trip signal is generated at the output 306 of the pulse counter and the output of the OR gate 390 only after the longer, first range of time delays.

When the output signals from the sensor 50 represent overcurrent in the line 32 greater than the transition current, the range selector 400 does not generate a blocking signal on its output 404. Thus, for overcurrent exceeding the transition current (hereinafter referred to as "high-moderate overcurrent") a trip signal is generated at the output 308 of the pulse counter and is received at the input 392 of the OR gate 390 after the above-referred to shorter range of time delays.

Figure 4:
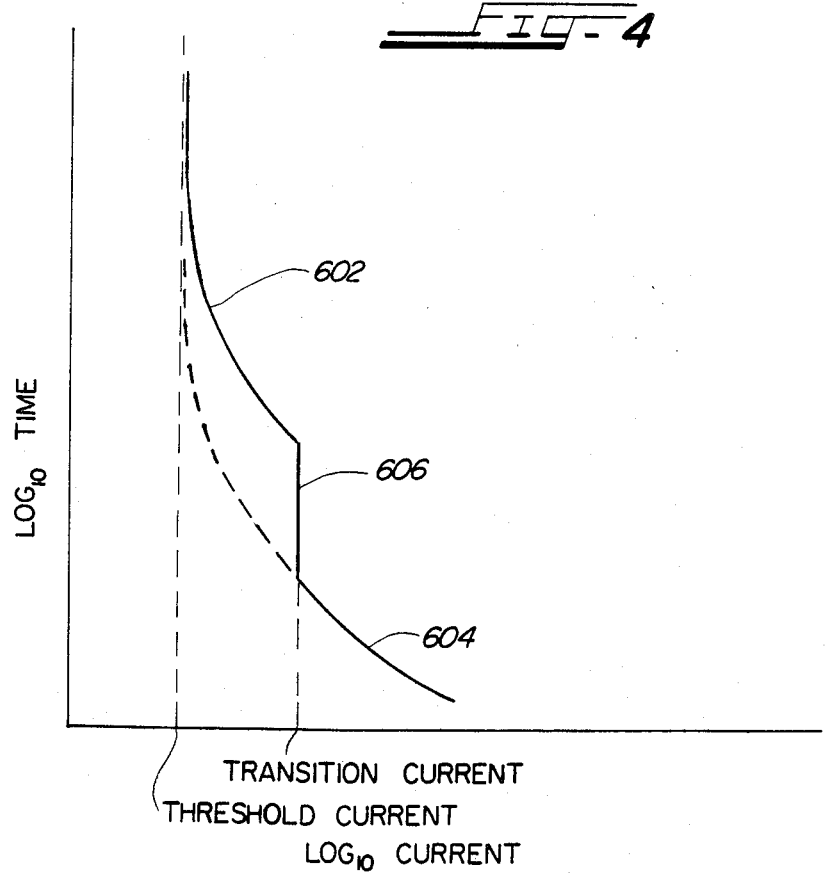

The trip signal generator 20 with the range selector 400 produces a trip signal on the output of the OR gate 390 according to the compound TCC curve illustrated in FIG. 4. When the current in the line 32 is below the threshold current, no trip signal is generated at the output of the OR gate 390, regardless of the length of time such current exists. When the line 32 carried low-moderate overcurrent (i.e., current greater than the threshold current but less than the transition current), a trip signal is generated at the output of the OR gate 390 by the first output 306 according to a first portion 602 of the TCC curve, which is similar to the TCC curve 500 in FIG. 3. When the line 32 is carrying high-moderate overcurrent, a trip signal first is generated at the output of the OR gate 390 by the second output 308 according to a second portion 604 of the TCC curve 600. Thus, the transition 606 between the two portions 602 and 604 is effectuated by the operation of the range selector 400.

In alternative embodiments of the trip signal generator 20 of the present invention, any desired number of overcurrent ranges may be realized by using a pulse counter 300 having as many outputs as the number of overcurrent ranges desired. A trip signal would be produced at each output after the pulse counter 300 counts a different, corresponding number of pulses. A gate 380 and associated range selector 400 would be provided for all the outputs except the one associated with the highest count. Thus, there would be a corresponding number of transition current magnitudes. Depending on the overcurrent in the line 32, one output of the pulse counter 300 and all higher count outputs would be capable of supplying a trip signal at the output of the OR gate 390. The trip signal to appear first at the output of the OR gate 390 would be the one produced by the lowest count output not blocked by the gate 380 and the blocking signal from the associated range selector 400. All lower count outputs would be prevented from supplying a trip signal to the output of the OR gate 390 by their associated range selectors 400 and gates 380. In this way, the trip signal generator of the present invention may produce a trip signal according to a TCC curve having any desired number of arcuate portions, each corresponding to one range of overcurrent in the line 32.

In another alternative embodiment, suitable connectors are provided for selectively applying only one out of two or more outputs of the pulse counter 300 to each input 382 of the gate 380 or input 394 of the OR gate 390.

Figure 1B:
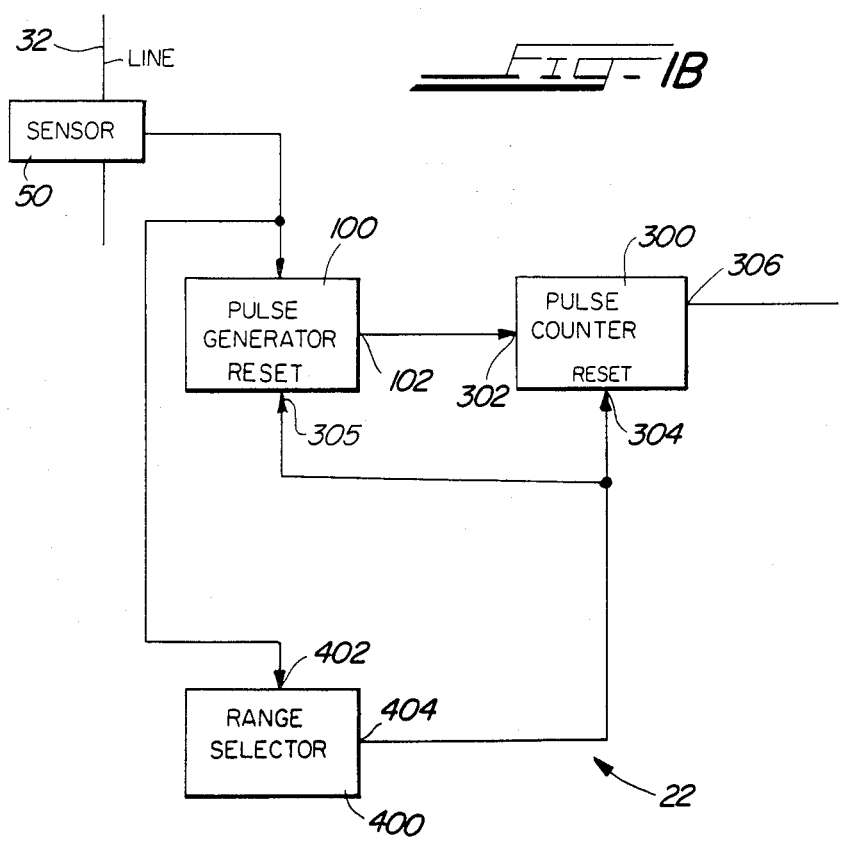
FIG. 1B is a block diagram of an alternative embodiment of the trip signal generator of the present invention.

In yet another alternative embodiment of the present invention illustrated in FIG. 1B, the level detector 200 and gate 380 are omitted. The blocking signal at 404 produced by the range selector 400 is applied to the reset input 304 of the pulse counter 300. In this embodiment, the range selector 400 is used to generate a signal which causes the pulse counter to reset its count to zero and to not count any pulses applied to its input 302 when the current in the line is below a transition current. When the magnitude of the current in the line 32 exceeds the transition current, the range selector 400 generates a signal at its output 404 that permits the pulse counter 300 to count the pulses applied to input 302. In this embodiment, one or more additional range selectors also could be used to generate blocking signals for controlling gates 380 associated with various output counts of the pulse counter 300. In a preferred arrangement, the blocking signal 404 produced by the range selector 400 is also connected to a reset input 305 of the pulse generator 100. Accordingly, the output 102 of the pulse generator 100 is returned or reset to a low level and no pulses are generated when the current in the line 32 is below a transition current. FIG. 5 illustrates the TCC curve of the trip signal generator 22 of FIG. 1B. The vertical dashed line labeled "threshold current" represents the current below which the pulse generator 100 does not operate. The dashed vertical line labeled "transition current" represents the current below which the range selector 400 produces the reset signal at 404. for currents above the transition level, the range selector 400 removes the reset signal at 404 and the pulse counter 300 is enabled to count pulses at 302 from the pulse generator 100 and to generate trip signals at the output 306 according to the portion 650 of the TCC curve. The dashed curved portion 652 represents the portion of the TCC curve over which the pulse generator 100 would be operative without the reset signal from the range selector 400.

With reference to FIG. 2, a specific embodiment of the trip signal generator 20 is shown. The trip signal generator circuit 20 may include a pulse generator 100 comprising a first operational amplifier 110 used as an integrator, a second operational amplifier 160 used as a Schmitt trigger, and associated circuitry as described below. The trip signal generator 20 also may include a level detector 200 comprising a third operational amplifier 210 used as a threshold detector and associated circuitry. As expalined more fully below, together the operational amplifiers 110 and 160 operate as a voltage-to-frequency converter. The trip signal generator 20 may also include a pulse counter 300. The range selector 400 if present, may include an operational amplifier 410 and associated circuitry used as a Schmitt trigger.

The sensor or trandsucer 50 may include a current transformer 56 for providing an alternating output current directly proportional to the current in the line 32, the line being protected by the circuit interrupter (not shown) operated by a trip signal on the output 398 of a NAND gate 391. The alternating output current of the current transformer 56 may be rectified by a full-wave bridge rectifier 52. The bridge rectifier 52 provides at the positive output 66 and the negative output 67 a full-wave rectifier current proportional to the current in the line 32. A load or sampling resistor 70 is connected form the negative output 67 of the bridge rectifier 52 to circuit common, thereby providing at the junction 72 a negative voltage proportional to the current in the line 32.

The voltage at the junction 72 is applied via resistors 120 and 122 to the inverting input 112 of the operational amplifier 110. Positive voltage is applied to the inverting input 112 of the operational amplifier 110 from a constant voltage reference 128 via a resistor 124. The voltage reference 128, as well as all the other voltage references described herein, may be provided by a power supply such as that described in the above-referenced co-pending application entitled "Power Supply for a Circuit Interrupter." The non-inverting input 114 of the operational amplifier 110 is connected via resistor 132 to circuit common.

Connected between the inverting input 112 of the operational amplifier 110 and the output of the operational amplifier 160 is a series combination of a resistor 170 and a diode 172. The junction between the diode 172 and the resistor 170 is connected to circuit common through a resistor 174. A feedback resistor 176 is connected from the output 166 of the operational amplifier 160 to its non-inverting input 164. A series combination of a feedback capacitor 180 and a resistor 178 is connected between the inverting input 112 of the operational amplifier 110 and the non-inverting input 164 of the operational amplifier 160. The output 116 of the operational amplifier 110 is connected to the inverting input 212 of the operational amplifier 210 and to the junction between the capacitor 180 and resistor 178. A constant positive voltage reference 220 is connected to the output 216 of the operational amplifier 210 through a resistor 218.

The non-inverting input 214 of the operational amplifier 210 is connected to a constant positive voltage reference source 222. The inverting input 162 of the operational amplifier 160 is connected to a constant positive voltage reference 168.

The counter 300 is powered by a constant reference voltage 316. The reference voltage 316 as well as the other reference voltages 128, 168, 220, 222, 420 and 448 and the operating voltage for the other active components illustrated in FIG. 2 may be provided by the power supply described in the above-referenced "Power Supply for a Circuit Interrupter" patent application. The counter 300 may have four outputs 320, 322, 324 and 326, which may be, for example, the 8-count, the 32-count, the 64-count and the 1024-count outputs, respectively. The counter 300 includes a pulse input 302 and an inhibit/reset input 304.

The portion of the circuit containing the operational amplifiers 110 and 160 operates as a voltage-to-frequency converter when there is overcurrent in the line 32, which produces pulses on the output 166 at a rate proportional to the difference between the overcurrent (represented by the negative voltage at the junction 72) and the threshold current (represented by the voltage reference 128). When there is an overcurrent in the line 32, the full-wave-rectified negative voltage at the junction 72 increases negatively, and the reference voltage 128 no longer supplies sufficient current to produce a positive voltage on the input 112 of the operational amplifier 110. Accordingly, the output of the operational amplifier 110 goes high. Current is supplied to the input 112 through the capacitor 180 from the output 116 of the operational amplifier 110. Thus, the output of the operational amplifier 110 begins to ramp increasingly positive from its normal low state as the capacitor 180 charges. As voltage at the junction 72 increases negatively, the output of the operational amplifier 110 ramps upwardly at a faster rate. When the voltage at the output 116 of the operational amplifier 110 is sufficiently high, the voltage applied to the non-inverting input 164 of the operational amplifier 160 from the junction between the resistors 176 and 178 exceeds the reference voltage 168 on the inverting input 162 by an amount sufficient to cause the output of the operational amplifier 160 to switch from its normal low state to a high state. High signals from the output 166 of the operational amplifier 160 are supplied through the resistor 170 and the diode 172 to the input 112, decreasing the need for the output 116 to supply current to the input 112 through the capacitor 180. The decreased need for current from the output 116 causes the voltage at the output 116 of the operational amplifier 110 to ramp down. As the voltage at the output 116 of the operational amplifier 110 ramps down, the voltage applied to the non-inverting input 164 of the operational amplifier 160 decreases, thereby causing the output 166 of the operational amplifier 160 to switch to the low state. If the voltage at the junction 72 remains sufficiently negative, this process is repeated. As long as a low signal is present on the inhibit/reset input 304 of the counter 300, each downward transition of the output of the operational amplifier 160 is recorded as a pulse by the counter 300. As discussed below, if the voltage at the junction 72 does not remain sufficiently negative (i.e., the current in the line 32 falls below the threshold), the output voltage of the operational amplifier 110 will ramp down low enough to cause the output voltage of the operational amplifier 210 to go high, hereby resetting counter 300 and inhibiting any further counting of pulses.

The operational amplifier 210 operates as a threshold detector, which prohibits the counter 300 from counting any pulses that may be applied to input 302 when the current in the line 32 does not exceed a predetermined "threshold level," as illustrated in FIGS. 3 and 4. This threshold current level can be adjusted by changing one or more of the values of resistors 120, 122, 124 or 440. For example, increasing the value of resistor 440 lowers the threshold current to which the voltage-to-frequency converter (comprising the circuitry associated with the operational amplifiers 110 and 160) responds, while decreasing the value of resistor 440 has the opposite effect.

In the above-described sequence, after initial ramp up of the output voltage of the operational amplifier 110, the output voltage of the operational amplifier 110, the output thereof continues to ramp up and down between limits for as long as the voltage at the junction 72 is sufficiently negative. The non-inverting input 214 of the operational amplifier 210 is normally (i.e., when the magnitude of the current in the line 32 is below the threshold) at a higher voltage than the inverting input 212, which results in the output 216 of the operational amplifier 210 normally being high. This high output is applied to the inhibit/reset input 304 of the counter 300, which resets the counter 300 to zero and prevents any pulses applied to input 302 from being counted. As the output voltage of the operational amplifier 110 initially ramps upwardly in response to an overcurrent in the lines 32, the voltage applied to the inverting input 212 of the operational amplifier 210 increases sufficiently to cause the output 216 to switch to the low state, thereby enabling the counter 300 to count pulses applied to the input 302. As long as the output 116 of the operational amplifier 110 continues to ramp up and down in response to an overcurrent, each pulse applied to the input 302 is counted by the counter 300. Should the negative voltage applied to the junction 72 decrease sufficiently (i.e., the current in the line 32 falls below the threshold), the output 116 of operational amplifier 110 returns to its low state and the output 216 of the operational amplifier 210 switches high, thus resetting the counter 300.

The ramping up and down of the ouput 116 of the operational amplifier 110 produces pulses at the output 166 of the operational amplifier 160 that are applied to the input 302 and counted by counter 300. It can be seen from the foregoing description that the rate of the ramping up and down is proportional to the magnitude of the voltage applied to the inverting input 112, which is determined by the difference between the negative voltage at the junction 72 and the positive reference voltage 128. The time constant of the intergrator comprised of the operational amplifier 110 and the associated circuitry is chosen to be short so as to minimize the effects of errors due to the use of non-ideal components.

After the eight pulses have been applied to the input 302 of the counter 300, the output 320 switches from a low to a high state. Similarly, the output 322 switches from a low to a high state after 32 pulses on the input 302 have been counted. In similar fashion, the outputs 324 and 326, respectively, switch from a low to a high state when a series of 64 and 1024 pulses, respectively, have been applied to the input 302. One of the outputs 320 and 322 can be selected and one of the outputs 324 and 326 can be selected by the use of movable connectors 340 and 342, respectively.

As described above, the trip signal generator of the present invention may also include a range selector 40. In the embodiment illustrated in FIG. 2, the operational amplifier 410 is used as a Schmitt trigger and functionally operates as a range selector. The inverting input 412 of the operational amplifier 400 is connected to a constant positive voltage reference 420 via a resistor 422. Negative voltage from the junction 72 is also applied to the inverting input 412 via resistor 120 and series resistors 430 and 432. A capacitor 434 is connected from the jucntion between the resistors 430 and 432 to circuit common. The resistor 440 is connected to ground from the junction to resistors 120, 122 and 432. The non-inverting input 414 is connected to circuit common through a resistor 442. The output 416 of the operational amplifier 410 is connected to its non-inverting input 414 through a resistor 444. The noninverting input 414 is connected to a constant reference voltage 448 through a resistor 446.

The resistor 432 and capacitor 434 operate as an RC filter for the negative voltage from the junction 72 to reduce the ripple in the dc voltage at the junction between the resistors 430 and 432. The dc voltage is applied to the inverting input 412 of the operational amplifier 410 through the resistor 430. The positive reference voltage 420 is added to this dc signal through the resistor 422. Thus, a positive dc voltage is applied to the inverting input 412. The positive voltage decreases as the negative voltage at the junction 72 increases (i.e., as the current in the line 32 increases). If the positive voltage applied to the inverting input 412 decreases to below the voltage being applied to the non-inverting input 414, the output of the operational amplifier 410 switches high. The resistor 440, 432, 430, 422, and 446, and the reference voltages 420 and 448 are selected or adjusted so that when the current in the line 32 is below the transition current, the output of the operational amplifier 410 remains low. The output of the operational amplifier 410 is high only when the magnitude of the current in line 32 exceeds the transition current. Feedback resistor 444 causes the operational amplifier 410 to operate as a Schmitt trigger by not switching until the transition current is crossed.

The output 416 of the operational amplifier 410 is applied to an input 383 of the two-input NAND gate 381. The other input 385 is connected to either the output 320 or the output 322 of the counter 300 by a movable connector 340. The output 387 of the NAND gate 381 is connected to an input 393 of the two-input NAND gate 391. The other input 395 is connected through an inverter 375 to either output 324 or output 326 of the counter 300 by a movable connector 342.

When the current in the line 32 is below the threshold (i.e., not an overcurrent), the output of the operational amplifier 110 is low, the output of the operational amplifier 210 is high, and all of the outputs 320-326 of the counter 300 are low. The low signal from either the output 320 or the output 322 (depending upon the position of the connector 340) of the counter 300 and the low signal from the output of the operational amplifier 410 are each applied to the inputs 385 and 383, respectively, of the NAND gate 381. The resultant ouptut of the NAND gate 381 is a high signal, which is applied to the input 393 of the NAND gate 391. A low signal is applied from either output 324 or output 326 (depending upon the position of the connector 342) of the counter 300 to the inverter 391, which converts the low signal to a high signal, and which, in turn, is applied to the other input 395 of the NAND gate 391. With a high signal on each of its inputs, the NAND gate 391 produces a low output signal when current in line 32 is below the threshold current (i.e., no trip signal is produced).

With reference to FIG. 4, if low-moderate overcurrent occurs in the line 32, the output of operational amplifier 410 remains low, as described above. Thus, even though a high signal will be applied by either output 320 or output 322 of counter 300 to one input of NAND gate 381, the output of NAND gate 381 remains high due to the low signal applied from the operational amplifier 410. The failure of the output of the operational amplifier 410 to go high effectively disables whichever output 320 or 322 of counter 300 is selected by the connector 340 and blocks the effect of any high signals appearing on the outputs 320 and 322. On the other hand, outputs 324 and 326 are not so disabled by the operational amplifier 410, and if a high signal is produced on the output 324 or 326 selected by the movable connector 342, a low output signal from inverter 375 will be applied to NAND gate 391. As a result, the output 398 of the NAND gate 391 switches high. This high signal is the trip signal that may initiate the interruption of the current in the line 32. It will be apparent from the foregoing that the range selector 400 and the movable connectors 340 and 342 determine which of the four outputs 320-326 is the one selected to provide the trip signal on output 398 for an overcurrent of a given magnitude.

Considering now a specific embodiment of the trip signal generator 22 of FIG. 1B and referring to FIG. 6, the trip signal generator 22 includes the sensor 50, the pulse generator 100, the pulse counter 300 and the range selector 400 of FIG. 1B all substantially as described in connection with FIG. 2. The trip signal output 398 is provided at the output of a selective connection arrangement referred to generally at 505. The selective connection arrangement 505 in a specific embodiment is implemented by a jumper arrangement such as 506 to connect one of the counter outputs 320, 322, 324 or 326 to the trip signal output 398. The range selector reset output 404 is provided at the output of an inverter gate 501. The input of the inverter gate 501 is connected to the output 416 of the operational amplifier 410 of the range selector 400. The reset input 305 to the pulse generator stage 100 is connected through a resistor 502 as an injected bias current into the summing node 112 of the operational amplifier 110 that functions as an integrator. The injection of the bias current via 305 holds the integrator off or to a low level ouput at 116 for all sensed currents in line 32 which are below the transition current of the range selector 400. The transition current is programmed or determined by the value of the resistor 440. Accordingly, for sensed conditions where the current in line 32 is not above the transition current for a sufficient period of time to result in a trip signal at 398 in accordance with the TCC curve of FIG. 5, the reset signal at 305 from the range selector 400 will reset the integrator amplifier 110 as the sensed current drops below the transition level. This function ensures that the timing period for the TCC curve of FIG. 5 will be accurately provided when the sensed current in line 32 again exceeds the level of the transition current.

The trip signal generator 22 of FIG. 6 also includes additional arrangments for providing the setting of the transition current level via resistor 440 independently of the threshold current level. Specifically, a resistor 504 is connected between the junction 72 and the junction of resistors 432 and 440. Additionally a second resistor 503 is connected between circuit common and the junction of the resistors 120 and 122. The value of the resistor 503 adjusts the threshold current level. This arrangement provides a flexibility of additional TCC curve selection for particular applications. If it is desired to simultaneously adjust both the transition current and the threshold current for the TCC curve while maintaining a fixed offset therebetween, the resistors 503 and 504 are omitted and the junction of the resistors 120 and 122 is connected to the junction of the resistors 432 and 440. This returns the input network from the junction 72 to the same configuration as described in connection with the trip signal generator 20 of FIG. 2. Considering additional modification to provide various TCC curves, the varying of the RC time constant of the integrator amplifier 110 provided by the capacitor 180 and the resistors 122 and 124 or the varying of the division ratio of the counter 300 moves the curved portion 650 of the TCC curve in the vertical direction as shown for example by the dashed curved portion 654.

While there has been illustrated and described various embodiments of the present invention, it will be apparent that various changes and modifications will occur to those skilled in the art. It is intended in the appended claims to cover all such changes and modifications as fall within the true spirit and scope of the present invention.

What is claimed and desired to be secured by Letters Patent of the United States is:

1. An apparatus for producing a trip signal in response to the occurrence of overcurrent in an alternating-current line, the overcurrent being greater than a threshold current, the trip signal being produced after a time delay that is inversely related to such overcurrent, said apparatus comprising:
    pulse generator means for generating pulses at a rate proportional to the overcurrent in the line;
    counter means having first and second outputs for counting the pulses generated by said pulse generator means and producing a first trip signal at said first output after said counter means has counted a first selected number of the pulses, and producing a second trip signal at said second output after said counter means has counted a second selected number of pulses, the first selected number of pulses being greater than the second selected number of pulses;
    reset means for resetting said counter means to an initial count whenever the current in the line is below a selected level;
    range selector means responsive to the current in the line for generating a blocking signal that is in a first state when the current in the line is below a transition current higher than the threshold current and in a second state when the current in the line exceeds the transition current; and
    gate means responsive to the blocking signal, said gate means having an input for receiving said second trip signal at said second output, said gate means also having an output to which is passed said second trip signal when the blocking signal is in the second state, and said gate means not passing to its output the second trip signal when the blocking signal is in the first state.

2. Apparatus as in claim 1, wherein the selected level is the threshold current.

3. Apparatus as in claim 1, wherein said reset means further comprises:
    level detector means which resets the counter in response to said pulse generator means not generating pulses.

4. Apparatus as in claim 1, wherein said pulse generator means further comprises:
    current means for producing current signals representing the current in the line;
    an integrator for integrating the current signals; and
    a Schmitt trigger for receiving the output of the integrator and for producing the pulses.

5. Apparatus as in claim 4, wherein said pulse generator means further comprises:
    bias means for preventing integration by the integrator except when the current signals represent overcurrent in the line.

6. Apparatus as in claim 1, wherein said pulse generator means further comprises current means for providing current signals representing the current in the line, and wherein said range selector means further comprises:
    a Schmitt trigger for receiving the current signals; and
    reference means for biasing an input of said Schmitt trigger such that said Schmitt trigger produces the blocking signal being in the first state as long as the current signals represent current in the line below the transition current.

7. The apparatus as in claim 1 wherein said pulse generator means generates pulses at a rate proportional to the difference between the overcurrent in the line and the threshold current.

8. Apparatus for producing a trip signal in response to the occurrence of overcurrent in an alternating-current line, which overcurrent exceeds a threshold current, the trip signal being produced after the passage of a time delay that is inversely related to such overcurrent, said apparatus comprising:

pulse generating means for producing pulses at a arate related to the overcurrent in the line;

counter means for counting the pulses, said counter having
(a) a first input for receiving the pulses,
(b) a plurality of counter outputs each corresponding to a range of overcurrent, said counter means producing a trip signal at each of said counter outputs after counting a corresponding selected number of pulses applied to the first input; and
(c) a reset input responsive to a reset signal for resetting the counter to its initial state and for preventing the counter from counting;

level detector means for applying a reset signal to the reset input of said counter means when the current in the line is less than the threshold current; and range selector means responsive to the current in the line for selecting one of the counter outputs to provide a trip signal and for blocking signals from all the counter outputs corresponding to lower selected numbers of counted pulses than the one selected counter output, whereby each counter output is selected to provide the trip signal for a range of overcurrent magnitudes such that a selected time delay before the production of a trip signal is provided for each range of overcurrent magnitudes.

9. Apparatus as claimed in claim 8, wherein the rate at which the pulses are produced is proportional to the difference between the overcurrent in the line and the threshold current.

10. An apparatus for producing a trip signal in response to the occurrence of overcurrent in an alternating-current line, the overcurrent being greater than a threshold current, the trip signal being produced after a time delay that is inversely related to such overcurrent, said apparatus comprising:

pulse generator means for generating pulses at a rate proportional to the overcurrent in the line greater than the threshold current;

counter means for counting the pulses generated by said pulse generator means and producing a signal after said counter means has counted a first selected number of the pulses, wherein the signal produced is a trip signal; and range selector reset means for resetting said counter means to an initial count whenever the current in the line is below a transition current higher than the threshold current.

11. The apparatus as in claim 10 wherein said pulse generator means generates pulses at a rate proportional to the difference between the overcurrent in the line and the threshold current.

12. Apparatus as in claim 10, wherein said pulse generator means further comprises current means for producing current signals representing the current in the line, and wherein said range-selector reset means further comprises:

a Schmitt trigger for receiving the current signals for producing an output signal which resets said counter means when the current signals received by said Schmitt trigger represent current in the line which is below the transition current.

13. Apparatus as in claim 12, wherein said pulse generator means further comprises:

an integrator for integrating the current signals; and
a Schmitt trigger for receiving the output of the integrator and for producing the pulses.

14. Apparatus as in claim 13, wherein said pulse generator means further comprises:

bias means for preventing integration by the integrator until the current signals represent overcurrent in the line.

15. Apparatus as in claim 14, wherein said output signal is also connected to said bias means to prevent integration by said integrator whenever the current is below said transition current.

16. Apparatus as in claim 16, wherein said range-selector reset means further comprises means for resetting said pulse generator means whenever the current in the line is below said transition current.

* * * * *